United States Patent [19]

Saracino

[11] Patent Number: 4,469,731
[45] Date of Patent: Sep. 4, 1984

[54] COMPOSITE INSULATING ARTICLE FOR MAKING PREFABRICATED COVERINGS

[75] Inventor: Paolo Saracino, Bussolengo, Italy

[73] Assignee: NORD BITUMI di Marco Danese & C. s.a.s., Verona, Italy

[21] Appl. No.: 304,813

[22] Filed: Sep. 22, 1981

[30] Foreign Application Priority Data

Jul. 2, 1981 [IT] Italy ............................ 22713 A/81

[51] Int. Cl.³ .............................................. E04C 2/34
[52] U.S. Cl. ...................................... 428/68; 52/805;
428/137; 428/141; 428/143; 428/145; 428/354;
428/355; 428/489; 428/913
[58] Field of Search ............... 428/141, 143, 148, 150,
428/251, 252, 283, 284, 285, 286, 343, 351, 352,
354, 355, 356, 489, 241, 325, 406, 40, 68, 137,
145; 52/805

[56] References Cited

U.S. PATENT DOCUMENTS

| 2,893,889 | 7/1959 | Schuetz et al. | 428/268 |
| 3,193,439 | 7/1965 | Price et al. | 428/268 |
| 3,369,956 | 2/1968 | Schuetz et al. | 428/268 |
| 3,874,983 | 4/1975 | Hay et al. | 156/227 |
| 4,050,607 | 9/1977 | Smith | 428/157 |
| 4,357,377 | 11/1982 | Yamamoto | 428/143 |

Primary Examiner—James J. Bell
Attorney, Agent, or Firm—Wenderoth, Lind & Ponack

[57] ABSTRACT

The invention concerns a composite article for making coverings, which comprises, in a stratified structure, a self-protecting outer membrane associated at its lower surface with an insulating layer which, in turn, is associated at its lower surface with a waterproofing and self-adhesive layer. The outer self-protecting membrane comprises a bituminous support and is covered on the outside by a protective layer. By means of the article according to the invention, a decorative covering, which comprises a vapor barrier, a thermal insulation, and a waterproof protective layer, is built in a single application phase at room temperature and without the use of adhesives.

7 Claims, 5 Drawing Figures

COMPOSITE INSULATING ARTICLE FOR MAKING PREFABRICATED COVERINGS

BACKGROUND OF THE INVENTION (a) Field of the Invention

The present invention concerns, as a new industrial product, a composite article particularly useful for making waterproof and thermally insulated prefabricated coverings, in the civil and industrial building art. The new product is particularly useful for making curved roofs and/or slabs, slanted at a grade of more than 5%.

(b) Prior Art

As is known, a significant portion of the waterproof coverings in civil and industrial building is made by using discontinuous elements such as e.g. fibro-cement sheets, metal and plastic sheets, and tiles of various types.

The fibro-cement sheets, commonly known by the name of "Eternit" trademark of Eternit S.p.A. of Genova, Italy, are constituted by a mixture of cement and asbestos and are laid on an cement support and are usually connected by mechanical joints whereby they create a type of covering which is widely used specially in industrial buildings.

Another type of very common, discontinuous elements covering is constituted by associated tiles, either of a traditional type (hollow tiles) or concrete tiles, or natural tiles (slate tiles) or bituminous tiles (these latter better known as "asphalt shingles"). These latter are constituted by a felt-cardboard or a glass mat impregnated with bituminous substances, are covered on their surfaces with granulated materials having various colours and are available in a great variety of shapes.

The tiles are normally applied on a wood or concrete support and the waterproof covering is built up by superimposing one element on the other. In some cases the elements of the covering are fixed to their support by mechanical means.

The prior art covering elements hereinbefore described have certain drawbacks.

In particular, the fibro-cement sheets, besides being intrinsically fragile due to the type of material employed, meet with ever increasing obstacles to their use because of the presence of asbestos in their composition. Certain countries have even forbidden the use of asbestos.

Further it may be necessary to use, with this type of discontinuous elements covering, gaskets and seals to reach the desired degree of air fastness.

A significant factor which limits the use of the prior art covering elements of the type hereinbefore specified is their weight which may attain in certain cases, e.g. in the case of cement tiles, rather high values (70–75 kg/m$^2$). This, of course, causes an increase in costs because the support has to be designed in such a way as to bear high loads.

Further, a covering may be made from tiles only if the design contemplates a slant of the roof of at least 20%: otherwise water may always infiltrate through the abutments of the various discontinuous elements which constitute the covering. Even when the covering has been designed with the appropriate slant, there is always the danger of water infiltrations due to particular atmospheric phenomena. Certain conditions of wind strength and direction may in fact force the water through the abutments between different covering elements.

It is also known that all new buildings must be thermally insulated due to the ever increasing cost of energy; specific laws and decrees which have been enacted in many countries in the last years prescribe the limiting values of the heat transmission coefficient K which are permissible in new buildings.

The thermal insulation of a covering made from discontinuous elements may be a costly operation from the installation viewpoint inasmuch as, as a general rule, a vapour barrier layer must firstly be provided, and it must be followed by the application of insulating means and finally by the installation thereabove of the discontinuous elements which constitute the covering.

The insulating materials presently used have to be applied by using adhesives of various nature, in the hot, in the cold, glues, adhesive ribbons, mechanical fixing means, welding, etc. This obviously complicates the operation of applying the insulating means by introducing a supplementary work phase and further creates various problems related in each instance to the specific nature of the adhesive means employed.

SUMMARY OF THE INVENTION

The main purpose of the present invention is to provide a new type of composite article for coverings of any kind, including coverings for curved roofs and/or slab roofs, which is capable of eliminating the aforesaid drawbacks of the known coverings, and which permits an easy, quick and efficient application, in a single phase, of a covering which comprises a water barrier, a thermal insulation and a protective and waterproofing layer, without the intervention and/or the use of adhesive agents of various types.

Another purpose of the present invention is to provide a composite article for coverings, which may be applicable, thanks to the fact that it also has waterproofing properties, to building coverings having a minimal slant, even as low as 5%, without the danger of water infiltrations in the abutments between one element and the other, as occurs with the coverings of the known art.

A further purpose of the present invention is to provide a composite article for building coverings, which has a high duration, resists degradation due to atmospheric agents, UV rays and moisture, is not deformable and at the same time is satisfactory from the viewpoint of appearance.

Another and not last purpose of the present invention is to provide a composite article for making coverings, which is particularly light and therefore may be applied on supports which do not require particular reinforcements, which supports may be of substantially any type, e.g. wood, concrete or metal supports.

Finally, another purpose of the invention is to provide a composite article of the aforementioned type made of materials which are readily available and have a moderate cost and which has a simple structure and is easily built.

The aforesaid and other purposes are attained by a composite covering article which is characterized by the fact that it consists of a stratified coherent structure comprising an outer self-protecting membrane, which is associated at its lower surface with an insulating layer which is associated at its lower surface with an insulating layer which in turn is associated at its lower surface with a waterproofing and self-adhesive layer, said self-protecting outer layer comprising a bituminous support provided with an outer protective covering or coating.

Conveniently, the composite covering article is made in the shape of modular prefabricated panels, having the desired shape and dimensions, adapted to be mutually interconnected and associated to obtain the desired covering surface.

DETAILED DESCRIPTION OF THE PREFERRED EMBODIMENT

The aforesaid and other purposes and advantages will be made clearer from the following detailed description of the invention, with reference to the appended drawings, wherein.

Figure 1:
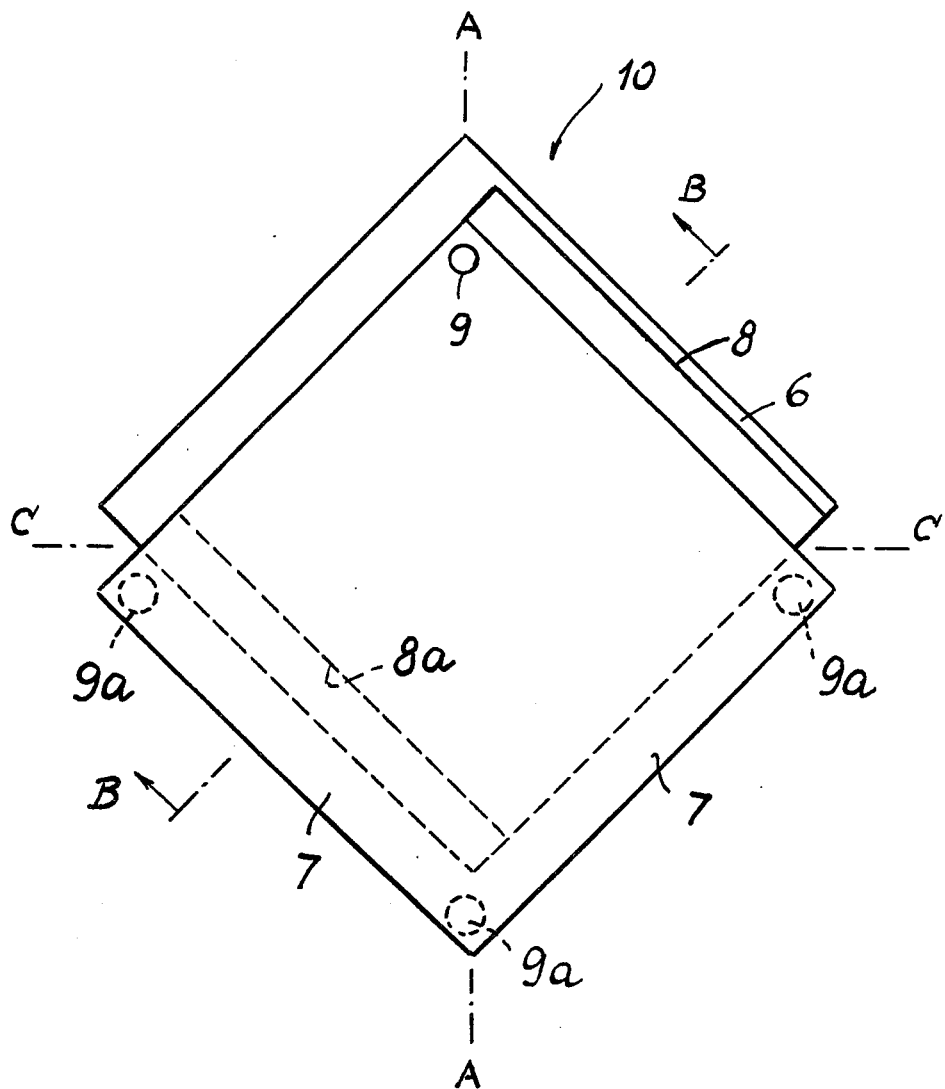
FIG. 1 is a plan view of a preferred embodiment of the composite prefabricated panel according to the present invention.
Figure 2:
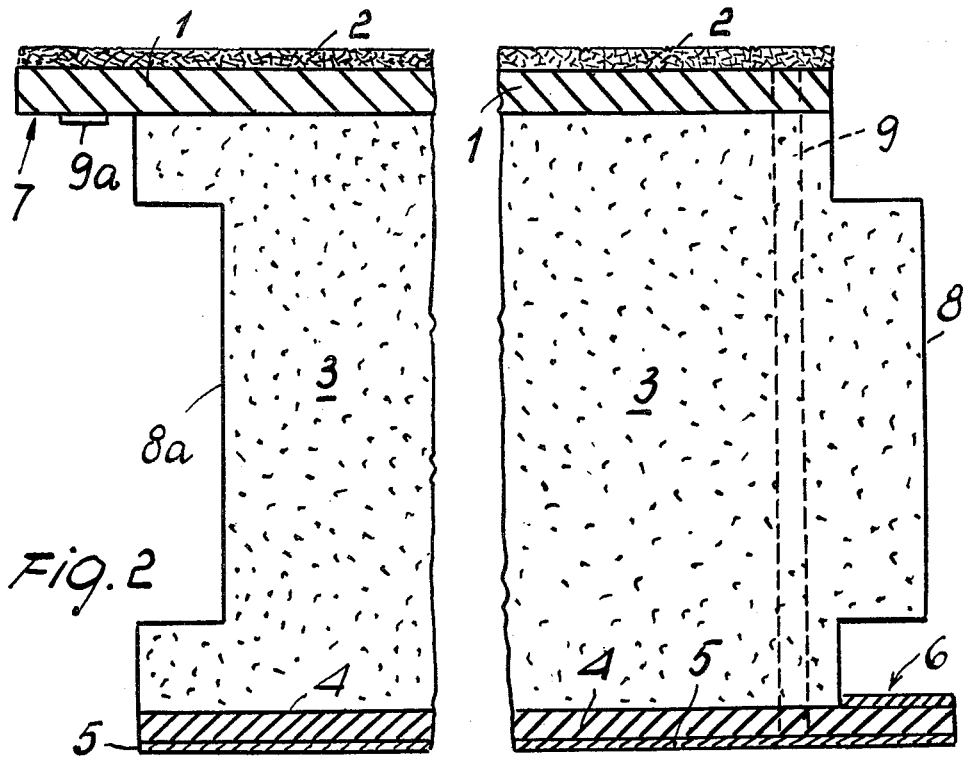
FIG. 2 is a cross-sectional view, taken on the line B—B of FIG. 1, of the same panel.
Figure 3:
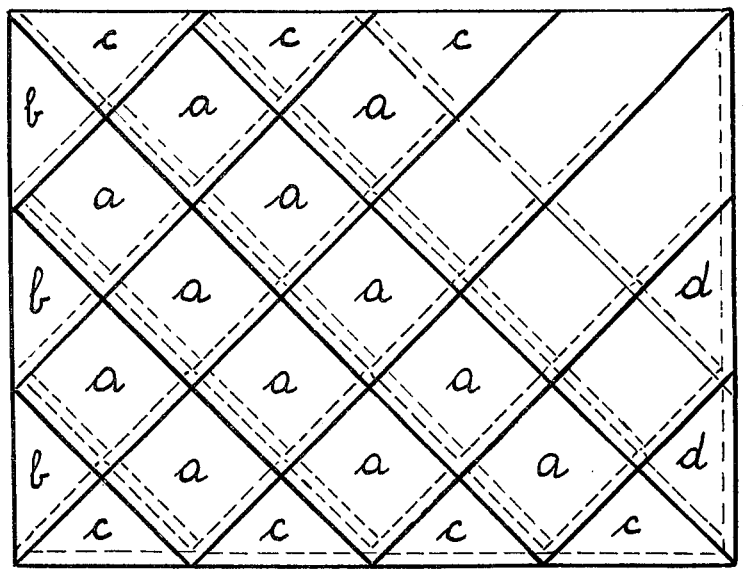
Figure 4:
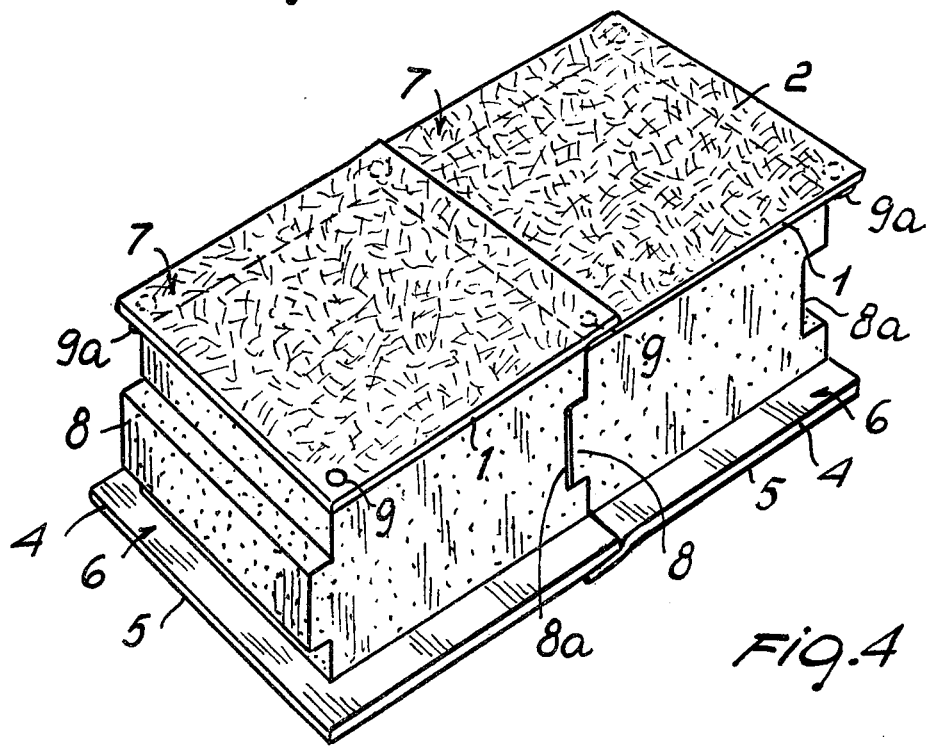

FIG. 3 schematically illustrates a covering surface made by the association of composite prefabricated panels according to the present invention;

FIG. 4 is a perspective view illustrating the association of two composite prefabricated panels according to the embodiment of FIGS. 1 and 2.

With reference to the drawings (FIGS. 1, 2 and 2A) the composite covering article according to the present invention, having the form of a prefabricated panel generally indicated at 10, is constituted by a self-protecting membrane comprising a bituminous support 1 and a protective outer coating 2 on the upper surface, upper when in use of the support 1, the self protecting membrane being fixedly associated, at its lower surface which has remained free with a layer of insulating material or insulating layer 3, the lower surface whereof is associated with a waterproofing and self-adhesive layer 4 covered on its free lower surface, lower when in use, by a anti-adhesive protective sheet 5, which can be removed at the moment said layer is set in place.

Figure 2A:
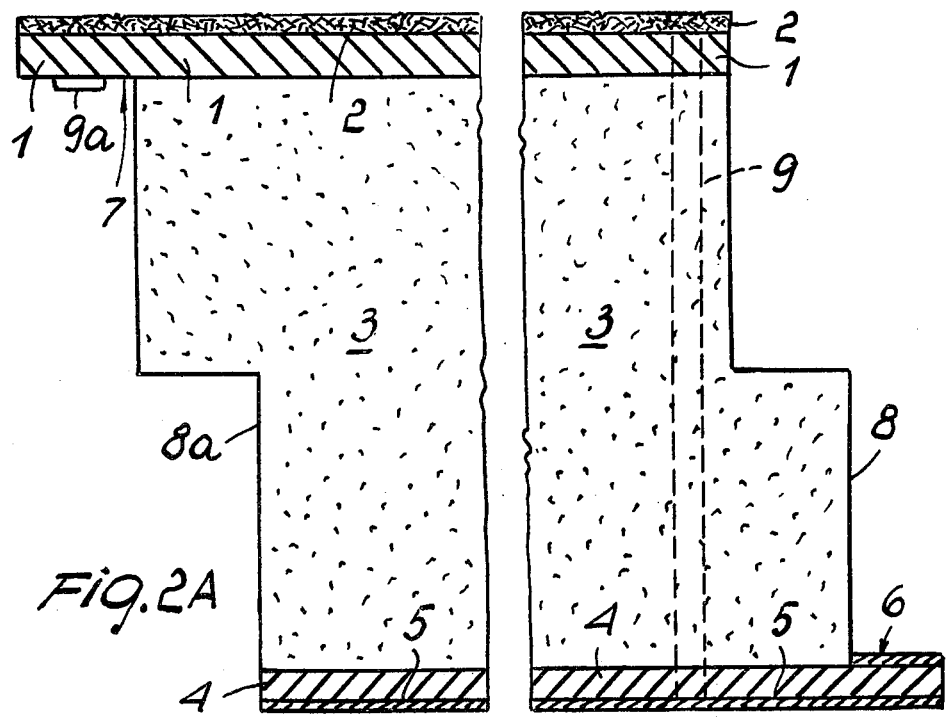
FIG. 2A is a cross-sectional view similar to that of FIG. 2 of a second preferred embodiment of the panel.

With reference to FIGS. 2 and 2A, the thickness of the layers is not critical; it may widely vary depending on the particular usage requirements. The self-adhesive and waterproof layer 4 has a thickness which may vary between 0.5 and 10 mm, whereas the thickness of the insulating layer 3 may vary depending on the required transmission coefficient K; in general thicknesses in the order of 30 and 40 mm are advantageous, finally the self-protected membrane layer, i.e. the bituminous support 1 together with the protective outer coating 2, has a thickness which may vary from 2 to 6 mm.

As already mentioned, the covering composite article 10 is constituted by a prefabricated modular panel having different shapes, but preferably a square shape, and different dimensions depending on the particular requirements. By joining various panels the ones to the others, in the sequences which will be illustrated hereinafter, coverings of any desired dimension and shape are obtained.

According to a preferred embodiment of the invention, in order solidly to connect the panels the ones to the others so as to conform them according to predetermined configurations, the self-adhesive and waterproof layer 4 has two portions having a suitable width which project with respect to the insulating layer 3, in the way of tongues or selvages for attaching and fixing the panel to another similar panel. The two projecting portions or selvages 6, in correspondence of two contiguous sides of the panel 10, are better shown in FIGS. 2, 2A and 4.

It is evident that both faces of the selvages 6 of self-adhesive material will be covered with a protective anti-adhesive sheet.

Further, in order to obtain a configuration which does not have clefts between panels, the self-protecting membrane too as portions having a suitable width which project with respect to the insulating layer 3, in the way of tongues or selvages 7 which overlap the self-protecting membrane of the adjacent panels when the panel is set in place.

Advantageously, but not necessarily, the two projecting portions of the self-protected membrane, or the selvages 7, are located on two contiguous sides of the panel in opposition with respect to the selvages 6 of the waterproofing and self-adhesive layer 4.

In order to absorb possible displacements of the insulating layer without endangering the stability of the structure, the insulating layer of each panel is provided at least on one side with a projection 8, suitably shaped, which at the moment it is set in place, engages or overlaps a recession 8a, which also has a suitable shape, formed in at least one other side of the panel.

FIGS. 2 and 2A illustrate two different embodiments of the projection 8 and the recession 8a of the insulating layer 3.

Further, in order to permit the application of the panels even at high slants, up to the vertical, each panel is provided with a suitably located hole 9, through which it is possible mechanically to fix it to the surface to be covered, made e.g. of concrete or wood, by any suitable mechanical fixing means, e.g. by means of a flat-headed nail.

In the assembling stage, the head of the nail or any other mechanical fixing means will then be covered on the outside by the selvages 7 of the self-protecting membrane of the adjacent panel. The nail head will further be sealed by a disk 9a of a self-adhesive waterproof material which is located at the corners of the selvages 7 of the self-protecting membrane of each panel, in correspondence, that is, of the hole of the adjacent panel. This for the purpose of preventing infiltrations of water through the seat of the nail and of avoiding that the selvage of the self-protecting membrane may be lifted by the action of the wind.

Although the structure or configuration of a panel according to a preferred embodiment of the invention has been described, in which embodiment both the self-protecting membrane and the self-adhesive waterproof layer have two protruding portions or "selvages" in a particular position as hereinbefore specified, it is obvious that the invention is not limited to such a particular configuration and that the number, the shape and the specific positions of the protruding portions or "selvages" may be as desired depending on the usage requirements of the panel itself.

FIG. 4 illustrates the junction of two identical composite panels by overlapping of the projections or selvages 7 of the self-protecting membrane, overlapping of the projections or selvages 6 of the self-adhesive waterproofing layer and connection through a mechanical fixing means (not illustrated) through the bore 9, sealed by a disk 9a of self-adhesive waterproofing material. In the assembling stage other identical composite panels will be associated to the panels of FIG. 4 in an analogous manner, so as to obtain a covered surface such as that illustrated in FIG. 3.

The waterproof and self-adhesive layer 4 employed in the new product, is essentially constituted by a mixture of bitumen and rubber, even regenerated rubber, either natural or synthetic, in the ratio 65:35 to 95:5 such as that described in the copending Italian application of the same applicant No. 20906 A/81.

The insulating layer 3 may be constituted by different types of materials normally used as insulating materials; preferably the insulating material to be employed should absorb very little water, have a good resistance to handling, to compression, to the temperature and a good dimensional stability. Cellular glass and glass fiber in panels may be indicated by way of example among the inorganic materials which may be employed as insulating material. Organic materials which may be indicated by way of example are expanded and impregnated cork in panels, polyurethane and polyisocianurate foams having suitable specific weight, extruded polystyrene foams, cross-linked polyethylene foams, polyvinyl chloride foams, etc. Preferably an insulating material is used which is available in the form of panels, although a material available in the form of rolls may be used as well.

The self-protecting membrane is constituted by a bituminous support 1 comprising bitumen or bitumen modified with plastomers, such as for example polypropylene, polyethylene, or elastomers such as natural rubbers, styrenebutadiene rubbers, ethylene propylene diene monomer (EPDM) (such as e.g. DUTRAL MN-AB1 of the MONTEPOLIMERI Company), or polychloroprene. A filler such as e.g. mica, talcum, silicates in general, and other additives having the main purpose of preventing thermal deterioration, may be successively added to the bituminous support.

The bituminous support of the membrane is internally provided with a reinforcement which assures its dimensional stability and improves its mechanical characteristics. The reinforcements used may be of various types: glass mat, glass fabric, non-woven polyester fabric, etc.

The "compound" which constitutes the bituminous support has a softening point P and A (ASTM D-36) comprised between 120° and 160° C. preferably between 130° and 150° C. The penetration (ASTM D-5) is comprised between 15 and 50 dmm preferably between 20 and 30 dmm. The viscosity of the bituminous support, measured at 180° C. by means of the Brookfield viscosimeter, Thermosel type, is comprised between 1500 and 10000 CP and preferably between 3000 and 6000 CP.

During the production, in order to obtain the self-protecting membrane, the bituminous support 1 is covered with an outer protective coating 2 of a material having a different type and colour, the function whereof is to preserve the "compound" or the bituminous support from degradation due to UV radiation and to confer thereto the desired appearance. Some of the materials which may be used as protective outer covering are: mineral granulates (slate plates, grits of different type and colour), metal sheets (alluminum or copper) paints, etc.

The protective anti-adhesive layer may be of any suitable material, e.g. silicon treated paper.

The application of the composite article according to the invention or of the panels, is carried out by exerting a certain pressure thereon, when in place, against the surface to be covered, after having removed the anti-adhesive protective sheet. Said operation is carried out at room temperature and without use of adhesive means of any kind.

A covering is thus obtained in a single operation, which comprises the vapour barrier, also acting as continuous waterproofing layer, the thermal insulation, the protection of the thermal insulation as well as a pleasant decorative effect.

The invention will be better understood from the following examples which illustrate its preferred embodiments without however limiting its scope.

EXAMPLE 1

Preparation of a slab covering with thermal insulation. A panel is produced according to the invention by coating the silicone treated side of a silicone paper sheet, having a weight of 100 g/m$^2$ and a width of 70 cm, with a mixture of bitumen and rubber, constituted by 90% of distilled bitumen with ASTM D-5 penetration equal to 180/200 and 10 parts of styrenebutadiene rubber Solprene 411 of the Phillips Petroleum Company until a thickness of 2 mm has been obtained at the temperature of 150°-180° C. A panel of extruded polystyrene of Roofmate type, of the Dow Chemical Company, having a thickness of 4 cm and dimensions 50×50 cm, is applied in the hot (60°-70° C.) to the self-adhesive film. The membrane self-protected with grit is associated to the aforesaid insulating material still on the production line, by previously melting in the hot the surface of the bituminous compound or by means of a cold adhesive. The covering element thus obtained is cut to the desired dimensions (50×50 cm), care being taken to leave two 10 cm wide edges or selvages of the self-adhesive and waterproofing layer and two 10 cm wide edges or selvages of the membrane self-protected with grit. By means of the covering element or panel made as hereinbefore described, a slab covering is made by applying the various elements on the surface to be covered or wood support, previously treated with a suitable primer.

The panels will be disposed as shown in FIG. 3. Starting from the low portion of the roof and going upwards, firstly the anti-adhesive sheet is removed which covers the covering element, and this latter is then caused to adhere to the wood surface by a slight pressure, and all the other elements will then be applied in the same way, care being taken mutually to overlap and seal the selvages of the self-adhesive and waterproofing layer and mutually overlapping the selvages of the membranes self-protected with grit.

The covering element is then fixed onto the bore provided for this purpose in the panel, by mechanical fixing means, and then the nail head is sealed by means of the disk of self-adhesive material hereinbefore described.

FIG. 3 shows the disposition of the several covering elements, once the covering is finished; therein five different forms of panels are seen: one of them corresponds to the panel described hereinbefore, which will be called "a base panel", and the other four are derived therefrom merely by cutting operations.

Going back to what is shown in FIG. 3 the following elements are seen:

a=base panel
b=right half of the base panel, cut in a longitudinal direction, along the line A—A of FIG. 1,
c=upper half of the base panel, cut in a transverse direction, along line C—C of FIG. 1, d=left half of the base panel, cut in a longitudinal direction, along the line A—A of FIG. 1, e=lower half of the base panel cut in the transverse direction, along the line C—C of FIG. 1.

By placing the covering elements which are the object of the present invention in the way which has been described hereinbefore, a continuous covering is obtained from discontinuous surface elements, without the intervention of adhesives of various type, in a single stage; said covering comprising a vapour barrier which also acts as a continuous waterproofing layer, the thermal insulation and the waterproof membrane, self-protected by means of grit, which operates as a protective layer for the underlying insulating material and as decorative element (tile). It is to be noted that the prefabricated panel hereinbefore described, which constitutes the covering element, has a weight which does not exceed 2000 g. Other dispositions of the panel may be conceived without limiting the scope of its application.

EXAMPLE 2

Preparation of a curved covering with thermal insulation on a concrete surface.

The covering element (panel) is prepared as described in example 1, except that a glass fiber panel having a thickness of 40 mm is used as insulating layer. The concrete surface should be smooth, free as much as possible from dust and dirt. It is firstly treated with a suitable primer on a bituminous base in an amount of 300–500 g/m² according to the porosity of the surface. The covering panels are then applied starting from the low portion of the roof, in the same way as described in example 1.

A continuous covering with discontinuous surface elements is thus obtained in a single application, without the intervention of adhesives of various types. Said covering comprises a vapour barrier which also acts as continuous waterproofing layer, the thermal insulation and the waterproof membrane, self-protected with grit, which acts as protective layer for the insulating means and as a decorative element (tile). Another great advantage of a covering of this type is its lightness: neither covering element actually exceeds a weight of 2000 g.

It is therefore possible, by means of the new product which is the object of the present invention, to combine the practical advantages of a continuous covering (constituted by the waterproofing and self-adhesive layer of each panel connected to that of the adjacent panel by mere overlapping and light pressure) with the appearance of a discontinuous covering (constituted by the membrane, self-protected with grit, which covers the upper portion of the panel).

I claim:

1. In a composite covering element, which consists of a stratified coherent structure comprising an outer self-protecting membrane, and comprising an insulating layer on its lower surface, said insulating layer further comprising a waterproofing and self-adhesive layer on its lower surface, said outer self-protecting membrane comprising a bituminuous support provided with an outer protective coating, the improvement wherein said composite covering element is made in the shape of identical modular panels, wherein the waterproofing and self-adhesive layer and the self-protecting membrane of each panel are each provided with at least one projecting portion for attaching and fixing it to a further modular panel.

2. A composite covering element as claimed in claim 1, wherein said insulating layer of each panel is provided on at least one side with a projection and on at least another side with a recession, said projection and recession having conjugated configurations for mutually assembling two adjacent panels.

3. A composite covering element as claimed in claim 1, wherein said bituminous support has an ASTM D-36 softening point between 120° and 160° C., an ASTM D-5 penetration of between 15 and 50 dmm, and a viscosity at 180° C. measured by means of Brookfield viscosimeter, of between 1500 and 10000 CP.

4. A composite covering element as claimed in claim 3, wherein said softening point is between 130° and 150° C., said penetration is between 20 and 30 dmm and said viscosity is between 3000 and 6000 CP.

5. A composite covering element as claimed in claim 1, wherein said outer protective coating is selected from the group consisting of slate granulates, metallic sheets and paints.

6. A composite covering element as claimed in claim 2, wherein said insulating layer is selected from the group consisting of organic materials comprising cork, polyisocianurate foams, expanded polyvinyl chloride, and inorganic material comprising cellular glass.

7. A composite covering element as claimed in claim 2, wherein the panel is provided with at least a bore, which serves as a seat for mechanical fixing means to attach the composite covering element to a structure to be covered, said bore being sealed on the outside by means of a disk made of a waterproofing and self-adhesive material.

* * * * *